Feb. 13, 1962
A. COX ET AL
3,020,804
OPTICAL OBJECTIVE
Filed Dec. 8, 1958
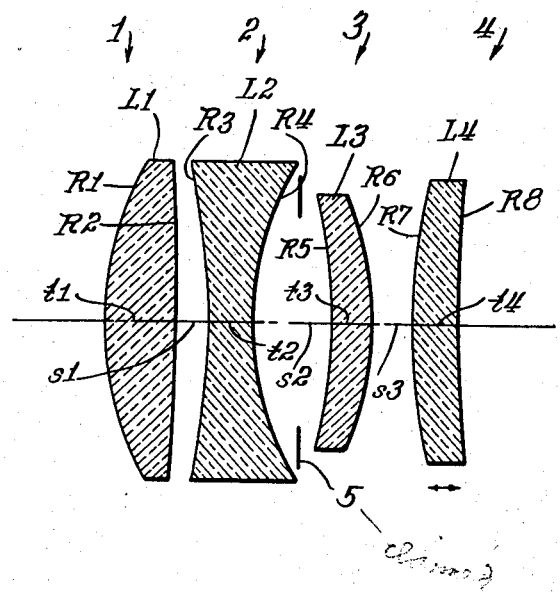
Inventors:
Arthur Cox
Irving C. Sandback
By Robert F. Miehle, Atty.

United States Patent Office 3,020,804
Patented Feb. 13, 1962

3,020,804
OPTICAL OBJECTIVE
Arthur Cox, Park Ridge, and Irving C. Sandback, Morton Grove, Ill., assignors to Bell & Howell Company, Chicago, Ill., a corporation of Illinois
Filed Dec. 8, 1958, Ser. No. 778,802
4 Claims. (Cl. 88—57)

This invention relates to an optical objective, and more particularly to a four-component optical objective optically corrected.

An object of the invention is to provide a highly corrected optical objective of four simple components.

Another object of the invention is to provide an optical objective having a biconvex front lens and a biconcave second lens in front of the stop with a third positive meniscus concave toward the stop and a rear positive meniscus convex to the stop.

Another object of the invention is to provide a compact objective having a field of view of at least fifty degrees with a flat field and distortion free.

Yet another object of the invention is to provide an objective having a front group of components from which light converges slightly and a rear positive component adjustable relative to the front group for adjusting the equivalent focal length of the objective with little effect on the high correction of the objective.

It is to be understood that the terms "front" and "rear" as herein used refer to the ends of the objective respectively nearer the longer and shorter conjugates thereof.

In the drawing, the single FIGURE illustrates an objective forming one embodiment of the invention. The objective includes a front simple biconvex component 1, a second biconcave simple component 2, a third positive meniscus component 3 and a rear positive meniscus simple component 4 with the components 1 and 2 in front of stop or diaphragm 5, which is located between the components 2 and 3. The components 1 to 4, comprise lenses $L_1$ to $L_4$ having radii of curvature $R_1$ to $R_8$, axial thicknesses $t_1$ to $t_4$ and axial separations $s_1$ to $s_3$. The component 4 is adjustable relative to the remaining components to vary the focusing distance of the objective while causing substantially no deterioration of the high correction of the objective.

The objective may be considered as comprising an intermediate biconcave component 2 with a positive front component 1 and a rear positive lens member or group divided into the components 3 and 4 with the positive components 3 and 4 meniscus and convex toward one another to have a minimum deviation of light rays from the optimum path, and the axial adjustment of the component 4 has virtually no effect on the correction of the objective. The Abbe dispersion numbers of the positive components 1, 3 and 4 should be greater than that of the negative component 2 to provide a low Petzval sum.

For high correction, the objective should comply with the following inequalities wherein F designates the equivalent focal length of the objective, $f_1$ to $f_4$ the respective focal lengths of the components 1 to 4 and $f_{3+4}$ the equivalent focal length of the components 3 and 4:

$$.4F < f_1 < .6F$$
$$.25F < -f_2 < .5F$$
$$.5F < f_{3+4} < .8F$$
$$1.0 < \frac{f_4}{f_3} < 1.5$$

To correct higher order coma and achieve balance of astigmatism, the objective should comply with the following inequality:

$$7 < \frac{R_2}{R_3} < 12$$
$$1.5 < \frac{R_5}{R_6} < 1.8$$
$$2.3 < \frac{R_8}{R_7} < 3.7$$

For correction of spherical aberration and coma, the objective should comply with the following inequality:

$$1.7 < -\frac{R_3}{R_4} < 2.7$$

Preferred constructions of the objective conform substantially to the following tables in which dimensions are in terms of inches and $n_d$ designates the refractive indices for the sodium D line and V the Abbe dispersion numbers, and $s_3$ indicates the axial separation for focal adjustments from five feet to infinity:

Example I

[Equivalent focal length=1.376. Back focal length=1.088. Aperture f/3.5]

| | | | | |
|---|---|---|---|---|
| $L_1$ | $R_1=+.4957$ | $t_1=.106$ | $n_d=1.694$ | $V=53.5$ |
| | $R_2=-9.857$ | $s_1=.055$ | | |
| $L_2$ | $R_3=-1.000$ | $t_2=.069$ | $n_d=1.621$ | $V=36.2$ |
| | $R_4=+.470$ | $s_2=.097$ | | |
| $L_3$ | $R_5=-.7667$ | $t_3=.062$ | $n_d=1.651$ | $V=55.8$ |
| | $R_6=-.477$ | $s_3=.025$ to $.057$ | | |
| $L_4$ | $R_7=+.9928$ | $t_4=.069$ | $n_d=1.651$ | $V=55.8$ |
| | $R_8=+3.131$ | | | |

Example II

[Equivalent focal length=1.395. Back focal length=1.119 to 1.076. Aperture f/3.5]

| | | | | |
|---|---|---|---|---|
| $L_1$ | $R_1=+.500$ | $t_1=.108$ | $n_d=1.694$ | $V=53.5$ |
| | $R_2=-10.000$ | $s_1=.056$ | | |
| $L_2$ | $R_3=-1.048$ | $t_2=.070$ | $n_d=1.621$ | $V=36.2$ |
| | $R_4=+.467$ | $s_2=.119$ | | |
| $L_3$ | $R_5=-.775$ | $t_3=.063$ | $n_d=1.694$ | $V=53.5$ |
| | $R_6=-.494$ | $s_3=.020$ to $.063$ | | |
| $L_4$ | $R_7=+.926$ | $t_4=.070$ | $n_d=1.694$ | $V=53.5$ |
| | $R_8=+2.136$ | | | |

Example III

[Equivalent focal length =1.377. Back focal length=1.12 to 1.08. Aperture f/3.5]

| | | | | |
|---|---|---|---|---|
| $L_1$ | $R_1=+.497$ | $t_1=.106$ | $n_d=1.6968$ | $V=56.2$ |
| | $R_2=-9.906$ | $s_1=.055$ | | |
| $L_2$ | $R_3=-1.035$ | $t_2=.069$ | $n_d=1.621$ | $V=36.2$ |
| | $R_4=+.460$ | $s_2=.117$ | | |
| $L_3$ | $R_5=-.769$ | $t_3=.062$ | $n_d=1.6968$ | $V=56.2$ |
| | $R_6=-.489$ | $s_3=.025$ to $.057$ | | |
| $L_4$ | $R_7=+.916$ | $t_4=.069$ | $n_d=1.6968$ | $V=56.2$ |
| | $R_8=+2.1222$ | | | |

The above described objectives are highly corrected, may be adjusted for focal lengths by moving only the rear component and, since the positive power of the group of lenses 3 and 4 behind the component 2 is divided, the convergence of rays of the component 3 is not great, whereby adjustment of the component 4 has little effect on correction of the objective.

While the invention is thus described, it is not wished to be limited to the precise details described, as changes may be readily made without departing from the spirit of the invention.

What is claimed is:

1. In an optical objective, proceeding from front to rear, a positive front component predominantly convex forwardly, a negative biconcave second component, a stop, a positive meniscus third component concave to the front, and an axially movable focusing positive meniscus rear component concave to the rear, and being further characterized in that the objective conforms substantially to the following inequalities in which $R_2$ to $R_8$ designate the respective radii of curvature of the surfaces of the components starting with the rear surface of the front component and proceeding to the rear:

$$7 < \frac{R_2}{R_3} < 12$$

$$1.7 < -\frac{R_3}{R_4} < 2.7$$

$$1.5 < \frac{R_5}{R_6} < 1.8$$

$$2.3 < \frac{R_8}{R_7} < 3.7$$

2. In an optical objective, proceeding from front to rear, a positive front component, a second negative component, a third positive meniscus component and a rear positive meniscus component, and further characterized in that said objective is constructed in substantial compliance with the following table in which dimensions are in terms of inches, and proceeding from front to rear, $L_1$ to $L_4$ designate the lenses, $R_1$ to $R_8$ the radii of curvature of the surfaces, $t_1$ to $t_4$ the axial thicknesses, $s_1$ to $s_3$ the axial separations, $n_d$ the indices of refraction for the D line and V the Abbe dispersion numbers:

| | | | | |
|---|---|---|---|---|
| $L_1$ | $R_1=+.4957$ | $t_1=.106$ | $n_d=1.694$ | $V=53.5$ |
| | $R_2=-9.857$ | $s_1=.055$ | | |
| $L_2$ | $R_3=-1.000$ | $t_2=.069$ | $n_d=1.621$ | $V=36.2$ |
| | $R_4=+.470$ | $s_2=.097$ | | |
| $L_3$ | $R_5=-.7667$ | $t_3=.062$ | $n_d=1.651$ | $V=55.8$ |
| | $R_6=-.477$ | $s_3=.025$ to $.057$ | | |
| $L_4$ | $R_7=+.9928$ | $t_4=.069$ | $n_d=1.651$ | $V=55.8$ |
| | $R_8=+3.131$ | | | |

3. In an optical objective, proceeding from front to rear, a front positive component, a second negative component, a third positive meniscus component and a rear positive meniscus component, and further characterized in that said objective is constructed in substantial compliance with the following table in which dimensions are in terms of inches, and proceeding from front to rear, $L_1$ to $L_4$ designate lenses, $R_1$ to $R_8$ the radii of curvature of the surfaces, $t_1$ to $t_4$ the axial thicknesses, $s_1$ to $s_3$ the axial separations, $n_d$ the indices of refraction for the D line and V the Abbe dispersion numbers:

| | | | | |
|---|---|---|---|---|
| $L_1$ | $R_1=+.500$ | $t_1=.108$ | $n_d=1.694$ | $V=53.5$ |
| | $R_2=-10.000$ | $s_1=.056$ | | |
| $L_2$ | $R_3=-1.048$ | $t_2=.070$ | $n_d=1.621$ | $V=36.2$ |
| | $R_4=+.467$ | $s_2=.119$ | | |
| $L_3$ | $R_5=-.775$ | $t_3=.063$ | $n_d=1.694$ | $V=53.5$ |
| | $R_6=-.494$ | $s_3=.020$ to $.063$ | | |
| $L_4$ | $R_7=+.926$ | $t_4=.070$ | $n_d=1.694$ | $V=53.5$ |
| | $R_8=+2.136$ | | | |

4. In an optical objective, proceeding from front to rear, a front positive component, a second negative component, a third positive meniscus component and a rear positive meniscus component, and further characterized in that said objective is constructed in substantial compliance with the following table in which dimensions are in terms of inches, and proceeding from front to rear, $L_1$ to $L_4$ designate the lenses, $R_1$ to $R_8$ the radii of curvature of the surfaces, $t_1$ to $t_4$ the axial thicknesses, $s_1$ to $s_3$ the axial separations, $n_d$ the indices of refraction for the D line and V the Abbe dispersion numbers:

| | | | | |
|---|---|---|---|---|
| $L_1$ | $R_1=+.497$ | $t_1=.106$ | $n_d=1.6968$ | $V=56.2$ |
| | $R_2=-9.906$ | $s_1=.055$ | | |
| $L_2$ | $R_3=-1.035$ | $t_2=.069$ | $n_d=1.621$ | $V=36.2$ |
| | $R_4=+.460$ | $s_2=.117$ | | |
| $L_3$ | $R_5=-.769$ | $t_3=.062$ | $n_d=1.6968$ | $V=56.2$ |
| | $R_6=-.489$ | $s_3=.025$ to $.057$ | | |
| $L_4$ | $R_7=+.916$ | $t_4=.069$ | $n_d=1.6968$ | $V=56.2$ |
| | $R_8=+2.1222$ | | | |

References Cited in the file of this patent

UNITED STATES PATENTS

| | | |
|---|---|---|
| 660,747 | Bausch | Oct. 30, 1900 |
| 1,463,132 | Graf | July 24, 1923 |
| 1,540,752 | Bielicke | June 9, 1925 |
| 1,739,512 | Lee | Dec. 17, 1929 |

FOREIGN PATENTS

| | | |
|---|---|---|
| 22,157 | Great Britain | of 1910 |
| 299,983 | Great Britain | Nov. 8, 1928 |
| 372,228 | Great Britain | May 5, 1932 |
| 403,706 | Germany | Oct. 7, 1924 |
| 440,229 | Germany | Feb. 4, 1927 |